Oct. 10, 1939.   C. R. PATON   2,175,280
MOTOR VEHICLE
Filed March 24, 1937
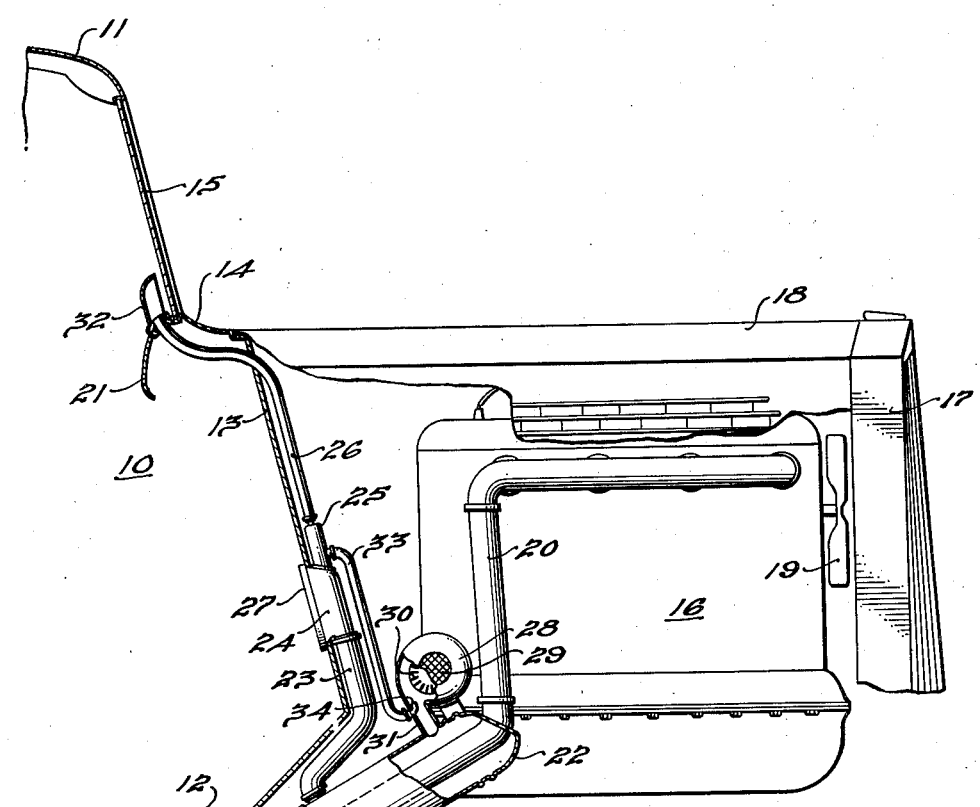
FIG. 1.
FIG. 2.
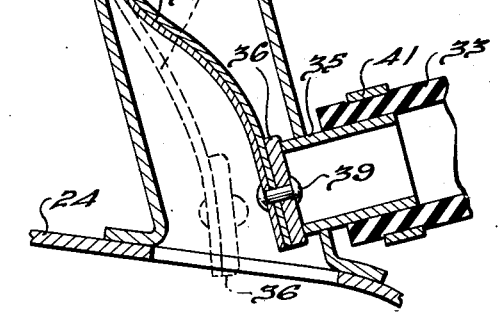
INVENTOR
Clyde R. Paton.
BY Sibbetts & Hart
ATTORNEYS.

Patented Oct. 10, 1939

2,175,280

UNITED STATES PATENT OFFICE 2,175,280

MOTOR VEHICLE

Clyde R. Paton, Birmingham, Mich., assignor to Packard Motor Car Company, Detroit, Mich., a corporation of Michigan Application March 24, 1937, Serial No. 132,759

6 Claims. (Cl. 20—40.5)

This invention relates to motor vehicles and more particularly to heating devices for motor vehicle windshields.

Various types of devices have been employed for applying heat to vehicle windshields to prevent the formation and collection of frost, ice and snow thereon. The most popular of these devices supply heated air to the windshield, and usually the fluid used in the engine cooling system or the engine exhaust gas is employed to heat the air. With the exhaust gas heating devices, the heated air sometimes has a temperature high enough to cause cracking of the windshield glass resulting in replacement that is expensive and objectionable to the vehicle owner.

An object of the invention is to provide a device for delivering air, heated by engine exhaust gas, to the windshield of a motor vehicle at a temperature below that which will cause glass cracking.

Another object of the invention is to control the temperature of heated air, diverted from a body heating system for heating a vehicle windshield, so that it will be maintained below that which will crack glass.

A further object of the invention is to provide an air heating device for motor vehicle windshields having means associated therewith for automatically maintaining the delivered air temperature below a predetermined degree.

Other objects of the invention will appear from the following description taken in connection with the drawing, which forms a part of this specification, and in which:

Fig. 1 is a side elevational view, partly broken away, of the front part of a motor vehicle having the invention associated therewith;

Fig. 2 is a sectional view of the windshield heating device taken through the temperature controlling portion thereof.

The body of a conventional motor vehicle is indicated generally by the numeral 10. Forming a part of such body is a roof 11, a floor 12, a dash 13, a cowl 14 and a glass windshield 15 fixed between the front end of the roof and the cowl.

Forwardly of the body is mounted an internal combustion engine 16 and forwardly of the engine is mounted a radiator structure 17. Mounted on the cowl and the radiator structure is a louvered hood 18 for enclosing the engine and its associated parts. The usual fan 19 is driven at the forward end of the engine for moving air through the radiator and the space between the engine and the hood. Leading from the engine exhaust gas manifold is a downwardly and rearwardly extending outlet conduit 20.

In the present instance the exhaust gas outlet conduit 20 serves as the heater for air and a sleeve or casing 22 is fixed to the conduit to provide a heating chamber. Leading from the heating chamber is a main feed line consisting of conduit sections 23, 24 and 26, suitably joined together, and leading to the heating chamber is supply line 31. The supply line connects with an air chamber 28 having an inlet 29 open to the space between the engine and the hood, and in this supply chamber is mounted a fan for moving air through the supply line, the heating chamber and the delivery line. The fan can be driven from the engine or by an individual motor. The section 26 passes through openings in the dash and the instrument board 21 so that its outlet end lies interiorly of the windshield. Attached to this outlet end of the conduit 26 is a deflector 32 for directing the delivered heated air toward the portion of the windshield to be heated.

The conduit section 24 has an outlet 27 open to the interior of the vehicle body so that the major portion of the heated air passes into the body while the remainder is diverted for heating the windshield. In this manner the same heater can be used for heating the interior of the body and for more direct application of heat to the windshield.

The heating means so far described has been used prior to this invention and it has been found that the temperature of air directed toward the windshield is high enough at times to crack it. In order to prevent this undesirable condition, I propose to associate with the delivery line means for controlling the temperature of the heated air so that its delivered temperature is below that capable of causing cracking of the windshield. To this end an auxiliary feed line for air, of a substantially lower temperature than that of the heated air, is connected in the delivery line and automatic control means is arranged to open and close such auxiliary line.

A conduit 33 is connected with a source of air having a temperature below that of the air in the delivery line and is suitably connected in the delivery line beyond the body outlet 27 and preferably in the head 25 of section 24. This conduit 33 is preferably a flexible tube and telescopes the outer end of a sleeve 35 projecting into and press-fitted in the head 25. A suitable clamp 41 secures the tube on the collar.

Arranged in the head is a valve 36 movable against and away from the inner end of the sleeve 35 to control the flow of air from the auxiliary line into the delivery line. This valve is fixed by rivet 39 to the free end of a temperature responsive member 37, in the form of a bimetallic strip, such member is riveted at 38 to the head 25 of conduit section 24. The thermostatic member is influenced by the temperature of the heated air in the delivery line and below a predetermined temperature its position will seat the valve, as shown in full lines in Fig. 2, to shut off the auxiliary line from the delivery line. The thermostatic member moves the valve away from the end of sleeve 35 when the air in the delivery line is above the predetermined temperature, as shown by the dotted lines in Fig. 2, to allow the flow of lower temperature air into the delivery line. This predetermined temperature is of course such that the maximum temperature of the delivered air will not crack the windshield.

The auxiliary conduit 33 is preferably connected at its inlet end with the casing 28 in order that the fan can be utilized for moving air therethrough, a separate fan for the auxiliary conduit being thus eliminated. The air moved through the auxiliary line is shunted around the heating chamber so that its temperature is much lower than that of the air in the delivery line passing through the heating chamber.

With the association of elements as herein described, I have provided a simple, inexpensive addition to the present windshield heating devices that will control the air temperature so that the danger of cracking windshields is eliminated.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A heating device for vehicle windshields comprising a main feed line in continuously open communication with a source of heated air, an auxiliary feed line leading into said main feed line, said auxiliary feed line being connected with a source of air having a lower temperature than the heated air in the main feed line, a valve controlling the passage of air from the auxiliary feed line into the main feed line, and temperature responsive means in said main feed line for actuating said valve.

2. A heating device for vehicle glass windshields comprising an unrestricted feed line having an outlet in close proximity to the windshield, means for moving heated air through said feed line, and a controlled auxiliary air supply means associated with said feed line for reducing the temperature of the heated air in the feed line.

3. A heating device for vehicle windshields comprising a main air feed line having an outlet directed toward the windshield, an auxiliary air feed line connected with the main conduit, a blower for moving air through said feed lines, means for heating the air passing through said main feed line, and valve means actuated in response to temperature of the heated air in the main line for controlling the passage of air from the auxiliary feed line into the main feed line to establish a maximum temperature for the air directed to the windshield.

4. In a vehicle, a windshield heater device comprising continuously open conduit means through which heated air is moved to a windshield, an auxiliary conduit for feeding unheated air into the conduit means, and thermostatically operated valve means in said conduit means controlling the delivery of unheated air from said auxiliary conduit into said conduit means, said valve means being operative to reduce the temperature of the heated air moved through the conduit means.

5. In a vehicle, a windshield heater device comprising conduit means for moving engine exhaust gas heated air to the windshield, an auxiliary conduit projecting into said conduit means for directing unheated air therein, a thermostatic strip anchored at one end in said conduit means, and a valve carried by the free end of the strip for association with the inner end of said auxiliary conduit, said strip moving the valve to unseated position when the heated air temperature reaches a predetermined degree.

6. A heating device for vehicle windshields comprising an unrestricted heated air feed-line having an outlet in close proximity to the windshield, an unheated air feed-line leading into the heated air feed-line, and a blower for moving air through both of said feed-lines.

CLYDE R. PATON.